United States Patent [19] [11] 4,271,102
Hrovat et al. [45] Jun. 2, 1981

[54] PROCESS FOR THE PRODUCTION OF CERAMIC FUEL PELLETS FOR NUCLEAR REACTORS

[75] Inventors: Milan Hrovat, Rodenbach; Hans Huschka; Lothar Rachor, both of Hanau, all of Fed. Rep. of Germany

[73] Assignee: Degussa Aktiengesellschaft, Frankfurt, Fed. Rep. of Germany

[21] Appl. No.: 80,323

[22] Filed: Oct. 1, 1979

[30] Foreign Application Priority Data

Sep. 29, 1978 [DE] Fed. Rep. of Germany ....... 2842402

[51] Int. Cl.$^3$ ............................................. G21C 21/00
[52] U.S. Cl. ..................................................... 264/0.5
[58] Field of Search ......................................... 264/0.5

[56] References Cited

U.S. PATENT DOCUMENTS 3,236,922  2/1966  Isaacs et al. ............................. 264/0.5
4,152,395  5/1979  Börner et al. ............................ 423/16

FOREIGN PATENT DOCUMENTS 1592468 12/1976 Fed. Rep. of Germany .
2623977 12/1979 Fed. Rep. of Germany .

OTHER PUBLICATIONS

Kummerer et al., KFK-1111 (Oct. 1969), EUR 4315d, Contribution I (28 pages).

Primary Examiner—Leland A. Sebastian
Attorney, Agent, or Firm—Cushman, Darby & Cushman

[57] ABSTRACT

A process for producing ceramic fuel pellets for nuclear reactors containing the fissionable material and/or fertile material in the form of the oxide or carbide by heating to a temperature above 1300° C. the crude molded fuel articles compacted to 30 to 60% of theoretical density at room temperature, molding in a die and ejection from the die wherein the heating, molding and ejection take place in a vacuum and the molding and ejection take place within 3 to 300 milliseconds.

12 Claims, No Drawings

PROCESS FOR THE PRODUCTION OF CERAMIC FUEL PELLETS FOR NUCLEAR REACTORS

BACKGROUND OF THE INVENTION

The invention is directed to a process for the production of ceramic fuel pellets for nuclear reactors which contain the fissionable and/or breeder material in oxide or carbide form by heating to a temperature above 1300° C. the fuel crude molded articles compacted to 30 to 60% of theoretical density at room temperature, compacting in a die and expelling from the die.

The fuel elements for light water reactors (LWR) and quick sodium cooled reactors (SNR) contain the fissile and/or fertile material predominantly in the form of sintered pellets of uranium oxide or a mixture of uranium oxide and plutonium oxide. The plutonium is preponderantly used in SNR reactors but also is employed in limited amounts in the LWR reactors in place of $U_{235}$. Besides fuel oxides there are also employed in SNR reactors fuel carbides (K. Kummerer, in KfK-1111 (1969), EUR-4315d (1969) Contribution I). The high susceptibility to corrosion of the carbide toward moisture, however, excludes the carbide as fuel in water or steam cooling.

While the LWR fuel pellets generally have a height of about 12 mm, a diameter of about 10 mm and a weight of about 10 grams, the corresponding data in the normal case for SNR tablets are 6 mm, 5 mm and 2.5 grams. Oxidic fuel pellets are customarily produced from uranium oxide powder ($UO_2$) of from mixed powder oxides $UO_2$ and $PuO_2$ by pressing, sintering and circular grinding. The oxides needed for this must inter alia particularly have sintering properties which can only be attained through expensive processes of production (e.g. see German Pat. No. 1,592,468, German AS No. 1,592,477 or German OS No. 2,623,977 and related Borner U.S. Pat. No. 4,152,395).

In the production of carbidic fuel there is first normally reacted uranium oxide powder, or a mixture of uranium-plutonium oxide powder with carbon by carboreduction to form uranium carbide or uranium-plutonium carbide and subsequently the reaction product finely ground to the sinterable powder. From this analogous to the oxidic field there are prepared pellets by pressing, sintering and grinding.

Isaacs U.S. Pat. No. 3,236,922 shows mixing which free uranium powder, carbon powder (e.g. graphite) and plutonium monocarbide. This mixture is cold compressed, sintered at 1000°–1300° C., the temperature allowed to go above the melting point of uranium metal and then the sintering completed to form mixed uranium monocarbide-plutonium monocarbide.

Furthermore, there have been experiments to produce oxidic and carbidic fuel pellets by hot pressing at the required temperatures of more than 1300° C. there cannot be solved industrially the material problems for punches and die. The tolerances in dimensions produced thereby nevertheless required an expensive subsequent processing. Therefore, this process has not acquired any industrial significance.

Besides it is known to prepare carbidic fuel cylinders by casting with subsequent working on all sides. With the small dimensions of the SNR pellets, however, this process is likewise uneconomical. The tight casting structure is unsuited for high burn-ups. For these reasons, this process also did not come to practical use.

The previous process for the production of sintered fuel pellets has a series of disadvantages, especially high demands are placed on the quality of the pressing powder.

The geometric density of the fuel pellets after the pressing is small and at a work tool maximum applied pressure of 500 to 1000 MN/m$^2$ (MN is the abbreviation for Mega-Newton) limited to less than 79% of the theoretical density. Consequently as expensive subsequent densification through sintering is required. In order to guarantee the quality of the sintered pellets high requirements are placed on the pressing powder in regard to the purity and sinterability which can only be fulfilled with expensive processes.

In the handling of plutonium because of its radiation danger and toxicity there must be provided special safety precautions which are very expensive and therefore raise the manufacturing costs considerably. The disadvantage in a Co precipitation from the production of uranium to plutonium to the $UO_2/PuO_2$ consists of the expansion of the expensive plutonium safety precautions also to the main component uranium, since already at the beginning of this process it must be mixed with plutonium.

The pyrophoric and hydrolytically sensitive properties of the sinterable carbide powder create in the production of uranium-plutonium pellets a further expense. For this reason extremely high requirements are placed on maintaining a highly pure atmosphere in the line of boxes. By these additional precautions the costs of manufacturing the fuel element are again increased. For these reasons the carbidic fuel, although known for many years, was used for special purposes but was not included broadly.

The presses used in the previous process for the production of fuel pellets with great molding force and the sintering furnace about 13 meters long require a large amount of space. Especially in the processing of plutonium containing fuel the boxing in of large devices is expensive and is connected with high maintenance and upkeep costs.

The diameter tolerances of the fuel pellets is $\pm 25\mu$. In order to keep this all pellets after the sintering must be circular ground to target dimensions. The decrease in weight in the grinding is 2 to 4%. Besides there cannot be avoided a scrap of about 10% through breakage of edges and through spalling. Above all the processing of the plutonium containing grits has proven extremely difficult and is associated with a very high expense.

The sintered fuel pellets in the reactor are frequently inclined to post sintering. This post densification increases the fission gas pressure inside the pellets and besides contributes to increasing the heat retarding gap between the pellets and the cladding tube and consequently the heat transfer is deteriorated.

SUMMARY OF THE INVENTION

The invention is directed to a process for producing ceramic fuel pellets for nuclear reactors containing the fissionable material and/or breeder (fertile) material in oxide or carbide form by heating to a temperature above 1300° C., e.g. up to 2200° C., the molded fuel articles compacted to 30 to 60% of theoretical density at room temperature, molding in a die and ejection from the die wherein the heating, molding and ejection take place in a vacuum, e.g. of at least $10^{-3}$ bar, and molding and ejection take place within 3 to 300 milliseconds.

It is decisive to this process that the porous, workable, ceramic fuel rough pressed articles be heated in a vacuum to temperatures above 1300° C., be compressed in the plastic condition to pellets of accurate size during which the contact time between pressed article and die is held so short that no mentionable heat exchange is possible between the pressed article and the die and that the pellets have already again left at the lower end of the plastic temperature range of the die. The introduction of heat into the die because of the extremely short contact time remains so small that conventional metal industrial materials can be used. Preferably, therefore, there are used steel dies.

The fuel preliminary pressed articles which are compacted to 30 to 60% of theoretical density are heated to temperatures above 1300° C. in a vacuum quickly transferred into a steel die suddenly compressed therein and jected. The compressing and ejection advantageously take place within 3 to 30 milliseconds, the vacuum preferably is to less than $10^{-6}$ bar.

There are produced a series of advantages with the process of the invention for the production of nuclear fuel pellets. In the cold compressing of the preliminary pressed articles there are placed no requirements, on powder quality, molding pressure and size accuracy. According to the invention, the porosity and density of the pellets is controlled within wide limits merely via the temperature and the amount of pressure applied in the hot impact molding. Preferably the heating and compressing take place at 1300°-2200° C. at a molding pressure of 30 to 300 MN/m². Particularly advantageous are temperatures of 1500°-2100° C. The previously necessary high demands on the quality of the pressed powder, above all in regard to the uniformity of the sintering ratio, are eliminated. The conversion of the starting compounds to the oxidic fuel powder therefore can take place with less expense than previously. For example, a dry operating conversion process can be employed whereby an additional post grinding can be eliminated. A particular advantage is the high accuracy of size of the pellets produced according to the invention, since the final dimensions are produced in the molding die. The tolerances produced are in the range of several microns. The grinding of the pressed articles to the final composition is eliminated, which is of significance, especially in the production of plutonium containing fuels. Through the possibility of replacing fine grain fuel powder by coarse powder with spherical nuclei the safety precautions in the production of plutonium containing fuel are made substantially easier. Since the powder is compressed in the plastic range there is required a relatively small molding pressure. The about 300° C. higher temperature in the impact molds of the invention compared to the maximum temperature in the previous sintering favors the mixed crystal formation of uranium oxide and plutonium oxide. Therewith the solubility of the fuel in nitric acid is increased and the dissolving in the reworking is made easier.

A particular advantage of the invention finally consists in the fact that with relatively simple and manageable apparatus having small space requirements there is produced high throughputs. With the process of the invention there can be produced the necessary one or two sided depression on the front of the fuel pellets (dishing) through corresponding configuration of the upper and lower punches.

Unless otherwise indicated all parts and percents are by weight.

The process can comprise, consist essentially of or consist of the steps set forth and the compositions employed can comprise, consist essentially of or consist of the materials set forth.

The invention will be further explained in the following examples.

EXAMPLE 1

Production of $UO_2$ Fuel Pellets

There was used as the starting powder for the production of pellets of $UO_2$ powder having an average particle size of 63 microns, a BET surface area of 4.65 m²/g, a bulk density of 2.9 g/cm³ and an O:U ratio of 2.08:1. There were molded from this $UO_2$ powder at an applied pressure of 110 MN/m² pellets having a height of 16 mm and a diameter of 12 mm. The green density of the pellets was 4.1 g/cm³, which corresponds to 37.4% of the theoretical density. The pellets were heated in a vacuum of $<10^{-6}$ bar to 1900° C., transferred to a steel die, compressed therein between two molding punches at an applied pressure of 120 MN/m² to finale dimensions and ejected. The compressing and ejection occurred in 4 milliseconds. In the heating to 1900° C. the pellet diameter was reduced about 3 mm. The pellets cooled to room temperature had a diameter of 9.1 mm and a height of 10.8 mm. The density was 10.46 g/cm³, which corresponds to 95.4% of the theoretical density.

EXAMPLE 2

Production of $UO_2$-$PuO_2$ Fuel Pellets

Except for the intermixing of 37 weight % $PuO_2$ powder to the $UO_2$ powder and reducing the applied pressure in the hot impact molding to 70 MN/m² all the remaining production steps remained unchanged. By the reduction in applied pressure the density of the final pellets was reduced to 9.86 g/cm³, which corresponds to 88.5% of the theoretical density.

EXAMPLE 3

Production of UC Fuel Pellets 1200 grams of $UO_2$ powder were homogenized with 158 grams of natural graphite powder and compacted to cylinders having a density of 4.25 g/cm³ and having a diameter of 10.19 mm and a height of 22.8 mm at an applied pressure of 130 MN/m². For the conversion to uranium monocarbide the fuel preliminarily molded articles were heated to 1750° C. under a vacuum in an induction furnace.

With an increase in density to 7.54 g/cm³ the diameter was reduced to 7.74 mm and the height to 15.51 mm. The pellets reacted to form UC analogous to the oxidic fuel were heated in a vacuum of $<10^{-6}$ bar within about 5 minutes to 1900° C., quickly transferred into a steel die, compressed therein to final dimensions and ejected. The compression and ejection occurred in about 24 milliseconds.

The data determined at room temperature on the finish molded pellets were diameter 7.9 mm, height 9.7 mm and density 12.93 g/cm³ or 95.0% of the theoretical density.

At a carbon content of 4.63 weight % the free carbon was 110 ppm.

The entire disclosure of German priority application P 28 42402.4 is hereby incorporated by reference.

What is claimed is:

1. In a process for the production of ceramic fuel pellets for nuclear reactors containing fissionable material, fertile material or a mixture of fissionable and fertile materials in the form of the oxide or carbide by heating to a temperature above 1300° C. the rough molded fuel articles compacted to 30 to 60% of theoretical density at room temperature, compacting in a die and ejection from the die the improvement comprising carrying out the heating, compacting and ejecting in a vacuum and carrying out the compacting and ejection in a combined time of 3 to 300 milliseconds.

2. The process according to claim 1 wherein the fuel pellets contain uranium oxide, a mixture of uranium oxide and plutonium oxide, uranium carbide or a mixture of uranium carbide and plutonium carbide.

3. The process of claim 2 wherein the fuel pellets contain $UO_2$.

4. The process of claim 2 wherein the fuel pellets contain $UO_2$ $PuO_2$.

5. The process of claim 2 wherein the fuel pellets contain UC.

6. The process of claim 1 wherein the compacting and ejecting are carried out in a combined time of 3 to 30 milliseconds.

7. The process of claim 6 wherein the vacuum is at least $10^{-6}$ bar.

8. The process of claim 1 wherein the vacuum is at least $10^{-6}$ bar.

9. The process of claim 1 wherein the molding is carried out in a steel die.

10. The process of claim 1 wherein the heating and molding are carried out at a temperature of 1300° to 2200° C. and at an applied pressure of 30 to 300 $MN/m^2$.

11. The process of claim 10 wherein the temperature is 1500° to 2100° C.

12. A process according to claim 11 comprising providing a one or two sided dishing on the front of the fuel pellets by corresponding configuration of the upper and lower punches.

* * * * *